(No Model.)

W. H. PENNY & W. A. BIGGERSTAFF.
FISH SCOOP.

No. 505,295. Patented Sept. 19, 1893.

Witnesses:
Hamilton D. Turner
Murray C. Boyer

Inventors:
William H. Penny
and
William A. Biggerstaff
by their Attorneys
Howson & Howson

UNITED STATES PATENT OFFICE.

WILLIAM H. PENNY AND WILLIAM A. BIGGERSTAFF, OF PHILADELPHIA, PENNSYLVANIA.

FISH-SCOOP.

SPECIFICATION forming part of Letters Patent No. 505,295, dated September 19, 1893.

Application filed August 13, 1892. Serial No. 442,987. (No model.)

*To all whom it may concern:*

Be it known that we, WILLIAM H. PENNY and WILLIAM A. BIGGERSTAFF, citizens of the United States, and residents of Philadelphia, Pennsylvania, have invented certain Improvements in Fish-Scoops, of which the following is a specification.

The object of our invention is to construct a fish weighing scoop of a much more durable and acceptable character than the scales now in use for the purpose, and this object we attain in the manner hereinafter set forth, reference being had to the accompanying drawings, in which—

Figure 1:
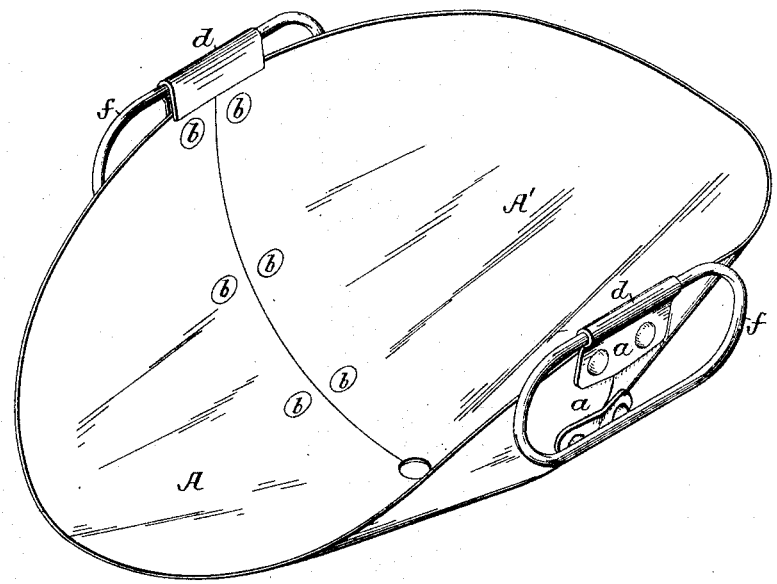
Figure 2:
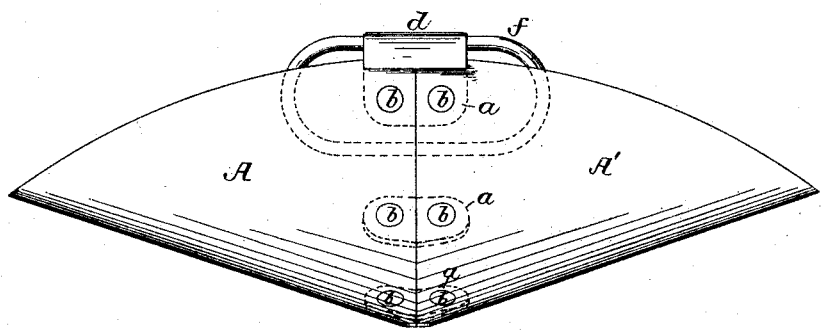

Figure 1, is a perspective view of a fish weighing scoop constructed in accordance with our invention; and Fig. 2, is a longitudinal sectional view of the same.

Ordinary fish scoops made of galvanized sheet iron are objectionable because they cannot be made strong enough to withstand the rough handling to which they are subjected, or the strain caused by the weight of the contents of the scoops, the latter being frequently three feet or more in length, and holding several hundred pounds weight of fish. We therefore make our improved scoop of sheet steel, which, being of a resilient character, will not be bent or battered out of form by the rough usage to which it is subjected, and which, moreover, permits us to make the scoop much lighter than the sheet iron scoops usually employed. As it would be difficult, however, to strike up a single piece of steel into the desired scoop-like form, we prefer to make the scoop of two parts A A' each forming one-half of the scoop, these sections abutting at their inner ends and being secured together by means of straps $a$ bridging the joint and secured by rivets $b$ to each half of the scoop. The top strap at each side of the scoop is extended so as to form a loop $d$ for the reception of the handle $f$ and the inner portion of said loop is carried downward so as to overlap the scoop at the joint and thereby provide an additional stiffening or strengthening element at that point. The joint may in some cases, however, be longitudinal instead of transverse, although the latter construction is preferred.

We have found in practice that a scoop constructed in this manner is both light and strong and owing to the resiliency of the sheet steel, the scoop cannot be battered out of form by any amount of rough handling which it is likely to receive in use. Hence the objections to the old form of scoop are effectually overcome.

Having thus described our invention, we claim and desire to secure by Letters Patent—

1. The within described fish scoop consisting of opposite halves formed of sheet steel and straps bridging the joint between the halves of the scoop and secured by rivets to each of said halves, the uppermost strap at each side of the scoop being bent into loop form and receiving a handle, substantially as specified.

2. The within described fish scoop consisting of opposite halves formed of sheet steel, and straps bridging the joint between the two halves of the scoop, and secured by rivets to each of said halves, the upper strap at each side of the scoop forming a handle receiving loop, and overlapping the upper edge of the scoop on the inner side, substantially as specified.

In testimony whereof we have signed our names to this specification in the presence of two subscribing witnesses.

WILLIAM H. PENNY.
WILLIAM A. BIGGERSTAFF.

Witnesses:
H. F. REARDON,
FRANK E. ZECHTOLD.